(12) United States Patent
Gao et al.

(10) Patent No.: US 12,149,938 B2
(45) Date of Patent: Nov. 19, 2024

(54) DYNAMICALLY ENCRYPTED RADIO FREQUENCY FINGERPRINTING

(71) Applicant: Cisco Technology, Inc., San Jose, CA (US)

(72) Inventors: Zhigang Gao, Twinsburg, OH (US); Huaiyi Wang, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 606 days.

(21) Appl. No.: 16/902,071

(22) Filed: Jun. 15, 2020

(65) Prior Publication Data

US 2021/0392497 A1    Dec. 16, 2021

(51) Int. Cl.
    *H04W 12/106* (2021.01)
    *H04L 1/00* (2006.01)
    *H04W 12/122* (2021.01)
    *H04W 12/79* (2021.01)

(52) U.S. Cl.
    CPC ......... *H04W 12/106* (2021.01); *H04L 1/0061* (2013.01); *H04W 12/122* (2021.01); *H04W 12/79* (2021.01)

(58) Field of Classification Search
    CPC . H04W 12/106; H04W 12/79; H04W 12/122; H04L 1/0061
    See application file for complete search history.

(56) References Cited

U.S. PATENT DOCUMENTS

| | | | |
|---|---|---|---|
| 7,415,043 B2 | 8/2008 | Kaewell, Jr. et al. | |
| 9,252,998 B2 | 2/2016 | Seely | |
| 10,223,507 B2 | 3/2019 | Kordik | |
| 10,397,080 B2 | 8/2019 | Brik et al. | |
| 2005/0195769 A1* | 9/2005 | Kaewell, Jr. | H04L 1/0606 370/335 |
| 2009/0141927 A1* | 6/2009 | Wang | G06T 1/0085 382/100 |
| 2010/0174791 A1* | 7/2010 | Tian | H04L 51/066 709/206 |
| 2013/0177061 A1* | 7/2013 | Ram | H04L 27/0014 375/226 |

(Continued)

OTHER PUBLICATIONS

J.L Padilla, P. Padilla, J.F Valenzuela-Valdes, J. Ramirez and J.M. Gorriz, "RF Fingerprint measurements for the identification of devices in wireless communication networks based on feature reduction and subspace transformation," ScienceDirect, vol. 58, Dec. 2014, pp. 468-475.

(Continued)

*Primary Examiner* — Kevin Bechtel
*Assistant Examiner* — Forrest L Carey
(74) *Attorney, Agent, or Firm* — Patterson + Sheridan, LLP

(57) ABSTRACT

Aspects described herein provide for hardening an RF signature by dynamically utilizing a sending device carrier frequency offset (CFO) as part of the RF signature. The CFO and the CFO varying pattern of wireless devices observed. A radio frequency signature at a sending device is paired to a frequency offset estimation algorithm at a receiving device, the final CFO estimation error may be bounded to a small range for various applications and communication protocols, and utilized to properly identify the sending device at the receiving device.

14 Claims, 9 Drawing Sheets

(56) References Cited

U.S. PATENT DOCUMENTS

| | | | |
|---|---|---|---|
| 2014/0031057 A1* | 1/2014 | Brassil | H04W 12/06 |
| | | | 455/456.1 |
| 2020/0059452 A1* | 2/2020 | Ravichandran | H04L 63/1416 |
| 2020/0081767 A1* | 3/2020 | Yang | H03M 13/091 |
| 2020/0112464 A1* | 4/2020 | Rogel | H04W 12/06 |
| 2021/0006567 A1* | 1/2021 | Sella | H03M 13/09 |
| 2021/0092593 A1* | 3/2021 | Yunusov | H04W 12/63 |

OTHER PUBLICATIONS

O. Ureten and N. Serinken, "Wireless security through RF fingerprinting," in Canadian Journal of Electrical and Computer Engineering, vol. 32, No. 1, pp. 27-33, Winter 2007, doi: 10.1109/CJECE.2007.364330.

* cited by examiner

DYNAMICALLY ENCRYPTED RADIO FREQUENCY FINGERPRINTING

TECHNICAL FIELD

Embodiments presented in this disclosure generally relate to network traffic security in communications between devices in a network. More specifically, embodiments disclosed herein relate to methods and systems for using a dynamic device fingerprint signature to avoid processing network traffic injected by malicious actors in the network.

BACKGROUND

As more and more devices are connected together in networks with the advent of the internet-of-things (IoT), network security associated with these devices is a primary concern for device users, manufacturers, and network administrators. Malicious actors interfering in the communications between these wireless or IoT devices can cause malfunctions in the networked devices which can range from network disruptions to damage to the networked devices. A component of robust network security is verifying that communications between networked devices and access points (AP) or gateways are from authenticated network devices.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
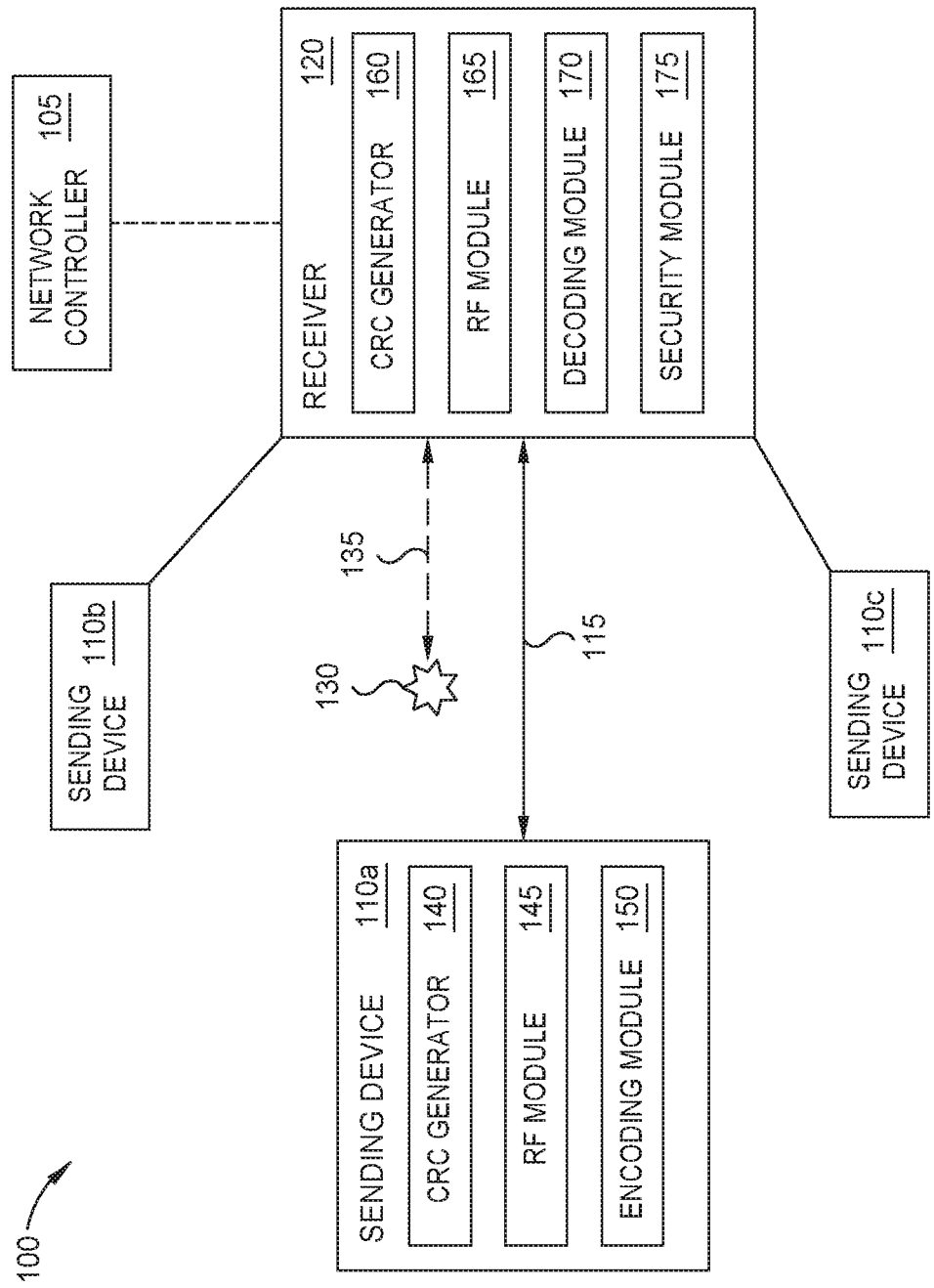
FIG. 1 illustrates a network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes extracting data bits from a packet to be transmitted by the client device; generating a cyclic redundancy check (CRC) value from the extracted data bits, mapping the CRC value to a CFO value in a radio frequency (RF) signature for a client device using an encoding process to produce an RF signature value, and transmitting the packet according to the RF signature value to a receiver to identify the packet as originating from the client device. Other embodiments of this aspect include corresponding computer systems, apparatus, and computer programs recorded on one or more computer storage devices, each configured to perform the actions of the methods.

In another example embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes determining, at a receiver, a carrier frequency offset (CFO) estimate for a client device, receiving a packet with an RF signature value marked as from the client device, decoding the RF signature value to determine an encoded CFO for the client device and a client cyclic redundancy check (CRC) value, comparing the CFO estimate and the encoded CFO to historical expected CFO value thresholds, when the comparison indicates the CFO estimate is within expected CFO values, processing the packet, and when the comparison indicates the encoded CFO is outside of expected CFO values, marking the packet for further inspection. Other embodiments of this aspect include corresponding computer systems, apparatus, and computer programs recorded on one or more computer storage devices, each configured to perform the actions of the methods.

In one example embodiment a system is provided. The system may include one or more computer processors and a memory containing a program which when executed by the computer processors performs an operation. The operation includes determining, at a receiver, a carrier frequency offset (CFO) estimate for a client device, receiving a packet with an RF signature value marked as from the client device, decoding the RF signature value to determine an encoded CFO for the client device and a client cyclic redundancy check (CRC) value, comparing the CFO estimate and the encoded CFO to historical expected CFO value thresholds, when the comparison indicates the CFO estimate is within expected CFO values, processing the packet, and when the comparison indicates the encoded CFO is outside of expected CFO values, marking the packet for further inspection.

Example Embodiments

As the number and variety of smart devices and connected mobile devices increases, networks are required to provide connection to more and more devices. For example, various types of consumer devices, industrial machines, and computer systems are increasingly incorporated into IoT infrastructures to offer additional functionality provided through network communications. These IoT infrastructures range from devices primarily targeted to consumers (e.g., residential appliances, etc.) to commercial and industrial applications (e.g., environment monitoring, industrial system monitoring and control, etc.).

These IoT infrastructures include multiple connected IoT devices connected through gateways or access points (APs) that provide network connection and control to a plurality of devices. In many cases, these devices are connected and authenticated using a single-characteristic security mechanism, such as using unique information (e.g., a media access control (MAC) address or a secret key assigned to the connected device). However, single-characteristic security mechanisms are often vulnerable to attacks such as man-in-the-middle (MITM) attacks where a MITM device intercepts communications, such as a packet, between a connected sending device and the receiving device. In some examples, a MITM modifies the intercepted packet and sends the modified packet to the receiver in an attempt to mimic the sending device. The modified packet may have the same header information (including MAC address, unique information, etc.), but the payload data maybe meaningless or even harmful.

In networks that do not mitigate these attacks, the connected devices may experience network disruptions or even experience damage when packets with malicious payloads are processed. Some solutions to ensure the communications between network devices are valid and uniquely identify the individual devices in a wireless network include using a composite signature which may include a radio frequency (RF) based signature, a physical layer behavior signature, device capability signature, channel scanning signature, etc. However, there are various remaining issues with securing an RF signature such that a MITM cannot mimic the RF signature.

As described herein, a RF signature can be strengthened by dynamically utilizing a sending device carrier frequency offset (CFO) as part of the RF signature. For RF signatures, the CFO and its corresponding varying pattern are two features of particular interest to the physical layer system identification. For example, from a system or network wide perspective with many various devices available for connection to a receiver, the CFO and the CFO varying pattern of wireless devices observed at the wireless APs or IoT gateways are to a great extent stochastic and also highly dependent on the environment. Thus, wireless device identification based on strict RF signature measurement such as CFO and CFO varying pattern is not trustworthy.

CFO is due to unintended and arbitrary frequency drift which may occur at local oscillators of both the sending device (e.g., IoT devices) and receivers (IoT gateways) due to component aging and environmental temperature change among other factors. In some examples, a maximum allowed frequency drift from a nominal frequency over time for a device is communication protocol dependent. For example, maximum frequency drift is approximately +/−20 parts per million (ppm) for Wi-Fi protocols, and +/−150 KHz for Bluetooth low energy (BLE) protocols. In some examples, CFO estimates at the receiver side may also be erroneous due to the imperfections of a propagation environment (e.g., the area around a network) and a CFO estimation algorithm at the receiver. Both of these factors render a direct exploitation of RF signature with a CFO component for wireless device identification difficult.

However, as described herein, a CFO of wireless devices remains constant over short periods of time, thus the CFO measurement at for a given short period may be regarded as an instantaneous characteristic attribute for each client device connected in a network. As described herein, the CFO measurement at a sending device is paired to a frequency offset estimation algorithm at a receiving device, the final CFO estimation error may be bounded to a small range for various applications and communication protocols (e.g., Wi-Fi and BLE) and utilized to properly identify the sending device at the receiver. In the systems and methods described herein, the sending devices and receivers solve these issues using dynamically encrypted RF signature values to harden the reliability in the RF signature.

FIG. 1 illustrates a network 100, according to one embodiment described herein. The network 100 includes a deployment of receiver devices including a receiver 120 under management by a network controller 105. The network controller 105 controls or manages a plurality of receivers including the receiver 120 (among other receivers not shown in FIG. 1). The receiver 120 may include APs, IoT gateways, and other receiver devices which provide a network connection via Wi-Fi, Bluetooth, BLE, or other communication protocol to provide network connections to connected client devices (e.g., sending devices). The network controller 105 provides control and network access to the receiver 120. The network access may include access to both internal networks (e.g., an intranet, IoT network, mesh network, etc.) and external networks (e.g., the Internet, wide area networks, etc.). The receiver 120, in turn, provides network access to client devices within the network 100 such as sending devices 110a-110c.

The sending devices 110a-110c may include any device (e.g., a client device, mobile device, IoT device, etc.) with a network interface capable of connecting to the receiver 120. For example, the sending device 110a sends and receives network traffic 115 to the receiver 120. While the network traffic 115 may include an identification of the sending device 110a (e.g., a MAC address, unique ID, etc.) malicious actors such as MITM 130 may intercept packets in the network traffic 115 and attempt to inject malicious traffic 135 into the network 100.

In some examples, the malicious traffic 135 includes packets with identifying information that represents itself as being from an authenticated sending devices such as the sending device 110a but with modified payloads which may cause disruptions in the network 100. For example, the malicious traffic 135 may cause network traffic disruptions for the receiver 120 and the sending devices 110a-c or may cause unwanted or harmful actions to take place at the receiver 120 and/or the sending device 110a.

Figure 2:
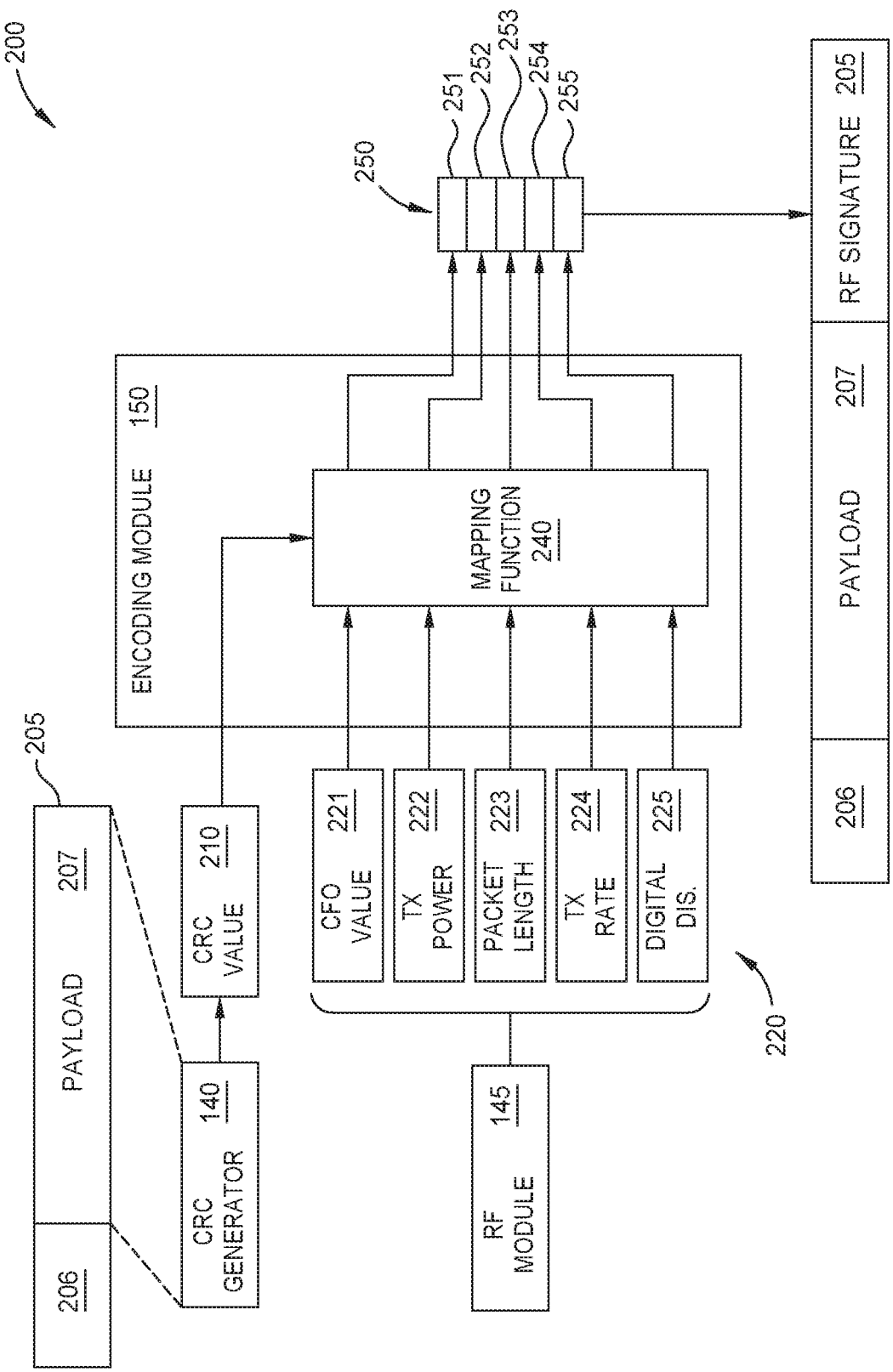
FIG. 2 illustrates a system flow diagram for a sending device, according to one embodiment.
Figure 3:
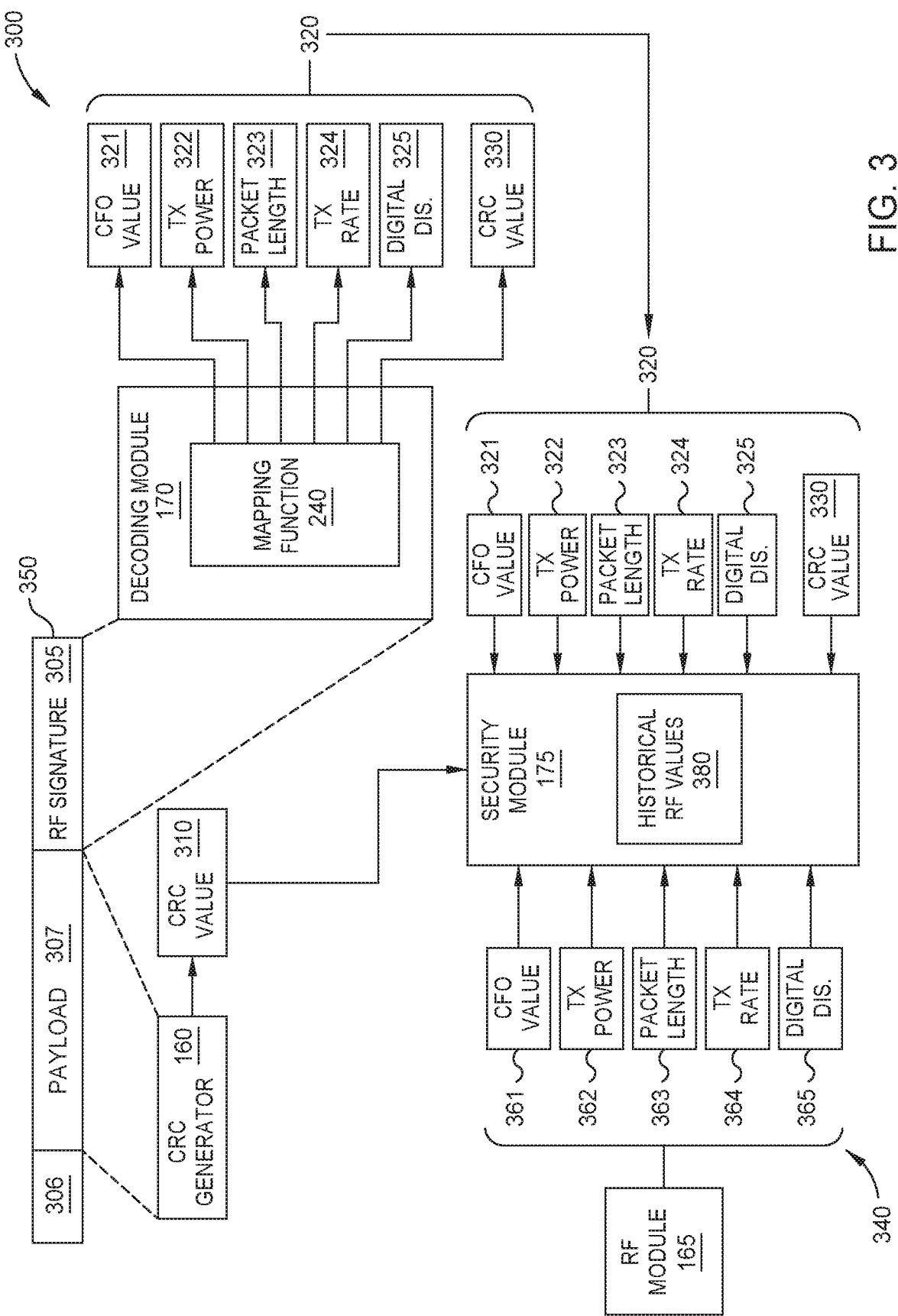
FIG. 3 illustrates a system flow diagram for a receiver, according to one embodiment.

To counteract the injection of malicious traffic 135 in the network 100 and prevent network disruptions and damage in the network, the sending devices 110a-c and the receiver 120 utilize dynamic RF signatures generated using a CRC generator 140, RF module 145, and encoding module 150 at the sending devices 110a-110c and a CRC generator 160, RF module 165, decoding module 170, and security module 175 at the receiver 120 as described in more detail in relation to FIGS. 2 and 3.

FIG. 2 illustrates a system flow diagram 200 for a sending device, according to one embodiment. The various modules show in FIG. 2 may be embodied on any of the sending devices 110a-c in the network 100 of FIG. 1. The system flow diagram 200 includes a packet 205. In some examples, the packet 205 is a packet destined for the receiver 120 in FIG. 1 via the network traffic 115. In some examples, the packet 205 includes a header 206 and a payload 207. The header 206 may include non-changing data or information which includes identifying information for the packet and sending device which is standard for all packets transmitted from the sending device. The payload 207 includes variable data that changes for each packet. For example, in an IoT network, the payload 207 includes IoT related data transmission generated at the sending device (e.g., the sending device 110a) and destined for an IoT gateway (e.g., the receiver 120) and the wider network 100. To provide greater protection to the network traffic 115 including the packet 205, the sending device includes the CRC generator 140.

As shown in system flow diagram 200, the CRC generator 140 generates a CRC value 210 using the payload 207. For example, the CRC generator 140 extracts data bits from the payload 207 and utilizes a CRC algorithm to generate the CRC value 210 from the extracted data bits. While described herein in relation to a CRC algorithm, any algorithm that uses the payload 207 to generate an output value may be used. In some examples, the CRC generator uses an initial state for the CRC algorithm assigned to the sending device by a receiver. For example, to provide more granular identification to the network traffic received at the receiver 120, the receiver 120 may assign a unique initial state for each of the sending devices 110a-c in the network 100. The resulting CRC values generated at the sending devices using the assigned initial states produce different and unique CRC values based on the initial states. The assigned initial state also increases the difficulty of the MITM 130 to produce a similar CRC value when the initial state for the sending device of the intercepted traffic is unknown to the MITM 130.

To provide unique identifying information for the sending device, the RF module 145 generates RF values 220. For example, the RF module 145 determines RF values such as a CFO value 221, a transmission (Tx) power 222, a packet length value 223, a Tx rate 224, and a digital distortion value 225. In some examples, the RF module 145 produces the RF values 220 for each packet to adequately capture the current RF conditions at the sending device. For example, the CFO value 221 is based on a CFO of the sending device, which may change overtime due to environmental and network factors. In some examples, the RF module 145 determines a frequency step for a client device CFO, where the frequency step includes a constant at least twice a possible CFO estimation error for the client device at the receiver (e.g., 200 Hz for BLE, etc.). The encoding module 150 uses the RF values 220 and the CRC value 210 to produce an RF signature value 250.

In some examples, only a subset of the RF values 220 or only one value is used to produce the RF signature value 250. For example, the encoding module 150 may map only the CRC value 210 to the CFO value 221, using a mapping function 240, to produce the RF signature value 250. In another example, the encoding module 150 uses a plurality of the RF values 220 and maps the CRC value to each value to produce the RF signature value 250. For example, the CRC value is mapped to the CFO value 221 to produce a first portion 251 of the RF signature value. In some examples, the CRC value 210 is mapped to Tx power value 222 to produce a second portion 252 of the RF signature value 250, the packet length value 223 is mapped to produce a third portion 253, the Tx rate 224 is mapped to produce a fourth portion 254, and the digital distortion value 225 is mapped to produce a fifth portion 255 of the RF signature value 250.

In some examples, the mapping function 240 is assigned to the sending device to provide a unique encoding function to the sending device and to synchronize the mapping function used by the receiver device to decode the RF signature value. In some examples, the RF signature value 250 is an inherent property of the packet and is used to transmit the packet. The encryption of the RF values 220 with the CRC value 210 provides both unique identification information in the packet and also prevents a MITM from being able to properly encode the similar RF values 220 and CRC values. The packet 205 with the RF signature value 250 is transmitted to the receiver 120 for processing as described in FIG. 3.

FIG. 3 illustrates a system flow diagram 300 for a receiver, according to one embodiment. The various modules show in FIG. 3 may be embodied as the receiver 120 in the network 100 of FIG. 1. The system flow diagram 300 includes a packet 305. In some examples, the packet 305 is a packet nominally received from a sending device 110a-c in FIG. 1 via the network traffic 115. That is, the packet 305 includes identifying information (e.g., MAC address or other information) indicating it is received from an authenticated sending device in the network 100. However, in some examples, the packet 305 may include a packet received from a MITM, such as the MITM 130 which is attempting to inject malicious traffic in the network 100. The processes described herein allows the receiver 120 to determine when the packet is valid or from a MITM.

In some examples, the packet 305 includes a packet header 306, a payload 307, and an RF signature value 350. The packet header 306 may include non-changing data or information which includes identifying information for the packet and sending device which is standard for all packets transmitted from the sending device. The payload 307 includes variable data that changes for each packet. For example, in an IoT network, the payload 307 includes IoT related data transmission generated at the sending device (e.g., the sending device 110a) and received at the receiver 120 for processing or forwarding to the wider network 100. As shown in system flow diagram 300, in order to provide greater protection to the network traffic 115 and prevent processing of malicious traffic 135, the receiver 120 includes the decoding module 170.

The decoding module 170 uses the mapping function 240 to decode the RF signature value 350 from the packet 305. In some examples, the RF signature value 350 is decoded into at least client CRC value 330 and various encoded RF values 320 which were encoded into the RF signature value 350 at the sending device. The encoded RF values 320 may include CFO value 321, Tx power 322, packet length 323, Tx rate 324, and a digital distortion value 325 each determined from respective portions of the RF signature value 350 as discussed in relation to RF signature portions 251-255 in FIG. 2. In some examples, the mapping function 240 is the same mapping function assigned to the sending device by the receiver 120 as described in FIG. 2.

The CRC generator 160 generates a CRC value 310 using the payload 307. For example, the CRC generator 160 extracts data bits from the payload 307 and utilizes a CRC algorithm to generate the CRC value 310. In some examples, the CRC generator uses the initial state for the CRC algorithm assigned to the sending device from which the packet 305 is received. For example, when the packet 305 indicates it is from the sending device 110a, the receiver 120 uses the initial state assigned to the sending device 110a to generate the CRC value 310 such that the CRC value 310 should match the CRC value 210 generated by the CRC generator 140 using the same initial state.

To provide current unique identifying information for the sending device, the RF module 165 generates RF values 340. For example, the RF module 145 determines a current CFO value 361 for the sending device. For example, receiver 120 may determine an accurate CFO value for the sending device using its own carrier frequency as the local reference for the sending device 110a, The RF module 165 may also determine a Tx power 362, a packet length value 363, a Tx rate 364, and a digital distortion value 365 for the current packet, packet 305. In some examples, only a subset of the RF values 340 or only one value (e.g., the CFO value 361) is needed for RF signature verification in the security module 175.

In some examples, the security module 175 includes historical RF values 380 for the RF values 340 which may include the most recent determined RF values for previous packets received from the sending device. For example, the security module 175 keeps track of RF values (including the RF values 340 and 320) for packets received from the sending device 110a. The security module 175 processes the various inputs including the CRC value 310, the client CRC value 330, the encoded RF values 320, and the RF values 340 to determine when the packet 305 is a from an authenticated sending device. In some examples, the receiver 120 compares various values to predefined thresholds as shown in Equation 1.

$$((f4-f3)-(f2-f1)) \leq \text{threshold value} \qquad (1)$$

For example, for a first packet the CFO value 361 estimated by the receiver is set as f1, and a decoded data portion bits indicate that the sending device's expected CFO value 321 which is set as f2. When a new packet arrives, the receiver 120 estimates a new CFO value 361 for the new packet (set as f3) and a decoded data portion to determine expected CFO value 321 (set as value f4) In some examples, the receiver 120 compares the difference in the various values ((f4−f3)−(f2−f1)) to a predefined threshold value (e.g., a small value representing a possible variation in the CFO between packet receptions) to verify the frequency offset relation is not violated. The difference calculated between f4 and f3 and f2 and f1 allows for the variations in the estimation of the CFO at the receiver and the CFO determined at the sending device. The overall calculation in Equation 1 allows for small differences in the CFO over a short time while ensuring that the CFO has not changed beyond the threshold value.

In some examples, the security module 175 also compares the CRC value 310 to the CRC value 330 as well as the various other values of the RF values 340 and encoded RF values 320 to validate the RF signature value 350. Differences between the various values may indicate that the packet 305 is not from the sending device indicated in the packet header 306. For example, a difference between the CRC value 310 and the client CRC value 330 may indicate that the payload 307 is different from the CRC value decoded from the RF signature, which may occur when a MITM 130 attempts to replicate an RF signature for the packet 305 and the replicated RF signature is decoded using the mapping function 240. When the security module 175 determines the various values do not match or are beyond various thresholds, the security module 175 reports the packet to a higher level security function (which may process the packet for further security information) or drops the packet from further processing.

Figure 4:
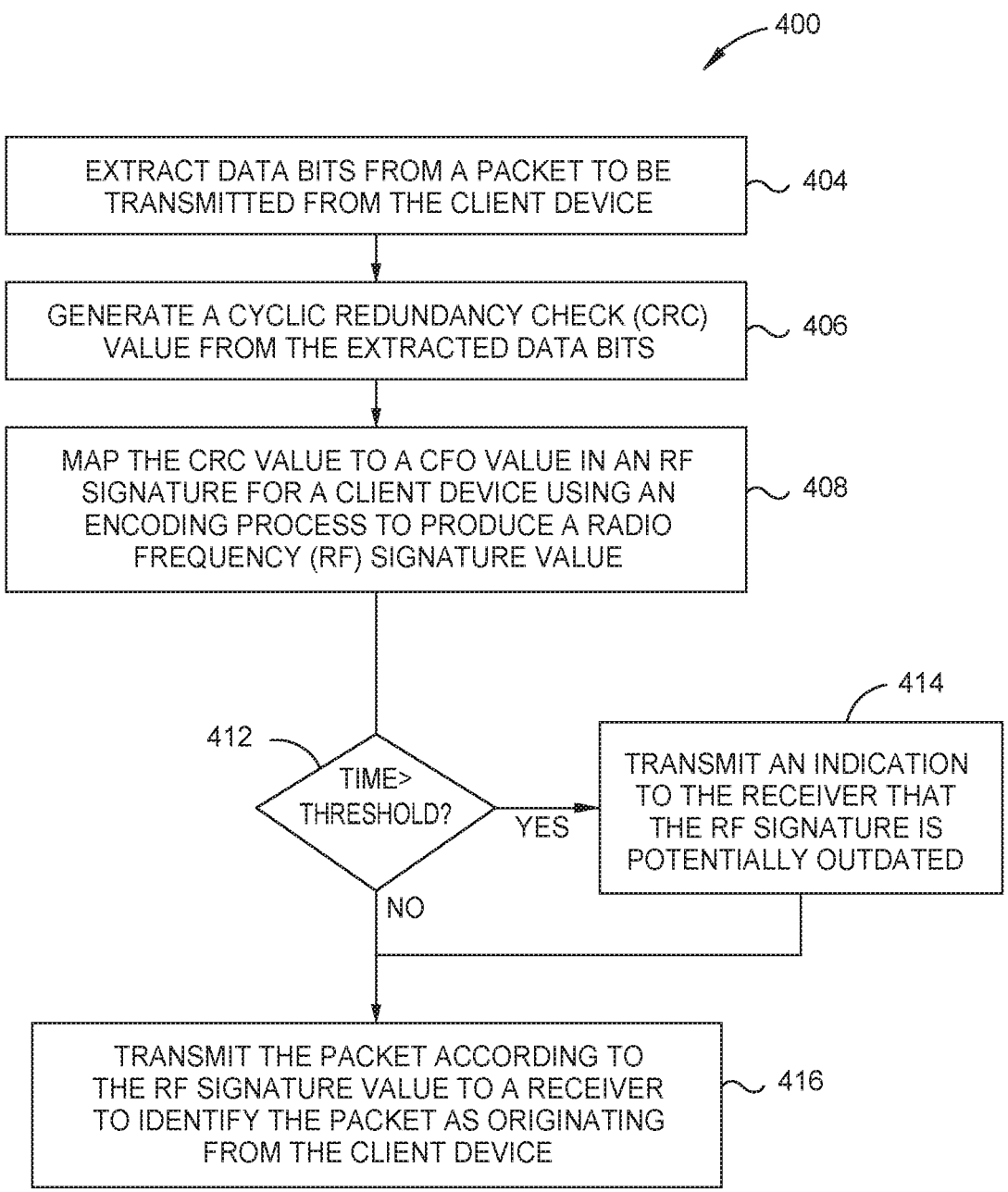
FIG. 4 is a method for encoding an RF signature at a sending device, according to one embodiment.
Figure 5:
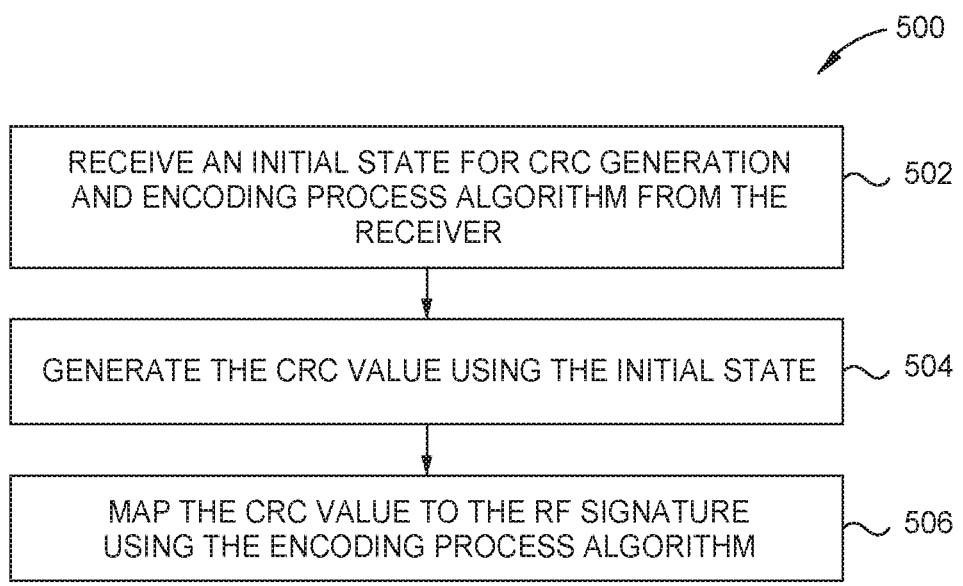
FIG. 5 is a method for encoding an RF signature using assigned processes at a sending device, according to one embodiment.

FIG. 4 is a method 400 for encoding an RF signature at a sending device, according to one embodiment. For the purposes of discussion, the method 400 as well as method 500 in FIG. 5 is described as being performed by the sending device 110a with reference to FIGS. 1 and 2. In some examples, the sending device 110a is embodied as a networked device 900 described in relation to FIG. 9. The sending device 110a includes the CRC generator 140, the RF module 145, and encoding module 150 which may perform the various operations described herein.

Method 400 begins at block 404, where the sending device 110a extracts data bits from a packet to be transmitted from the client device. For example, the CRC generator 140 extracts the data bits from the payload 207 of the packet 205 shown in FIG. 2. At block 406, the sending device 110a generates a CRC value from the extracted data bits for the packet. For example, the CRC generator 140 generates the CRC value 210 from the extracted data bits of the payload 207.

At block 408, the sending device 110a maps the CRC value to a CFO value in an RF signature for a client device using an encoding process to produce an RF signature value. For example, the encoding module 150 maps or encodes CRC value 210 to the various RF values 220 to produce the RF signature value 250. For example, the CRC value 210 is mapped to the CFO value to produce the first portion 251 of the RF signature value 250. In some examples, the CRC generator 140 and the encoding module 150 utilize components or states received from the receiver 120 to perform the processes described in blocks 406 and 408, as described in method 500 of FIG. 5.

FIG. 5 is a method for encoding an RF signature using assigned processes at a sending device, according to one embodiment. Method 500 begins at block 502, where the sending device 110a receives an initial state for CRC generation and an encoding process algorithm (e.g., mapping function 240) from the receiver 120, where the initial state and the encoding process algorithm are assigned to the client device (e.g., the sending device 110a) by the receiver 120.

At block 504, the sending device 110a generates the CRC value 210 using the initial state and maps the CRC value 210 to the various values of the RF signature using the encoding process algorithm at block 506. The assigned values allow for the sending device 110a to impart unique and granular identifiers to the values generated as part of the RF signature.

Returning back to method 400 in FIG. 4, at block 412 the sending device 110a determines when a time between packets sent is above a threshold difference. For example, when too much time has passed between packets being sent from the sending device 210a to the receiver 120, the verification process at the receiver may not validate or verify the RF signature value 250 correctly. When the time difference is above the threshold, method 400 also proceeds to block 414. At block 414, the sending device 110a transmits an indication to the receiver that the RF signature value is potentially outdated or not properly verifiable at the receiver 120. This indication may be included in the packet 205 or transmitted as a separate communication.

At block 416, the sending device 110a transmits the packet with the RF signature value to a receiver to identify the packet as originating from the client device. For example, the sending device 110a transmits the packet 205 with the RF signature 250 as shown in FIG. 2. The packet is then received by the receiver 120 and the RF signature value 250 is verified as described in relation to FIGS. 6-8.

Figure 6:
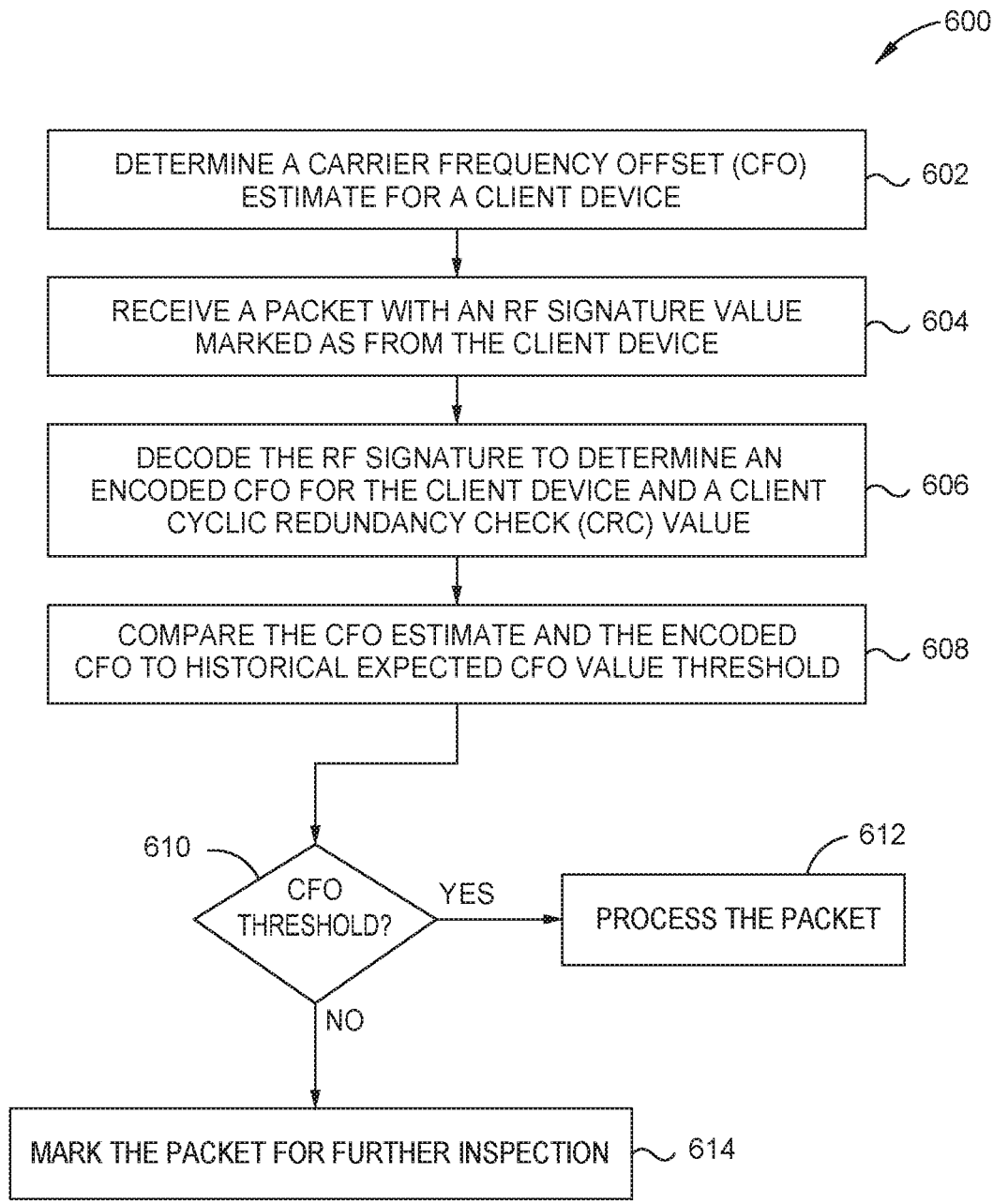
FIG. 6 is a method for communication security at a receiver, according to one embodiment.

FIG. 6 is a method 600 for communication security at a receiver, according to one embodiment. For the purposes of discussion, the method 600 as well as method 700 in FIG. 7 and method 800 in FIG. 8 is described as being performed by the receiver 120 with reference to FIGS. 1 and 3. In some examples, the receiver 120 is embodied as the networked device 900 described in relation to FIG. 9. The receiver 120 includes the CRC generator 160, the RF module 165, decoding module 170, and security module 175 which may perform the various operations described herein. Method 600 begins at block 602 where the receiver 120 determines a CFO estimate for a client device. For example, using its own frequency offset and a CFO estimation algorithm given various details about the sending device 110a, the receiver 120 determines a CFO estimate for the sending device 110a such as the CFO value 361. In some examples, the receiver 120 may also generate/determine additional RF values such as the RF value 340 for further verification of RF signatures at the receiver 120.

At block 604, the receiver 120 receives a packet with an RF signature value marked as from the client device. For example, the receiver 120 receives the packet 305 shown in FIG. 3. In some examples, the packet 305 is the packet 205 sent from the sending device 110a. In some examples, the packet 305 is marked or identified as coming from the sending device 110a but is received from the MITM 130. The verification processes described herein allows the receiver 120 to determine the validity of the packet before processing or forwarding the packet.

At block 606, the receiver 120 decodes the RF signature to determine an encoded CFO for the client device using a predefined mapping algorithm. For example, as shown in FIG. 3, the decoding module 170 decodes the RF signature value 350 and/or a first portion of the RF signature into at least the CFO value 312 using the mapping function 240 to decode the RF signature value 250. In some examples, the decoding module 170 also decodes a second portion of the RF signature to determine a Tx value for the client device, decodes a third portion of the RF signature to determine a packet length value for the packet, decodes a fourth portion of the RF signature to determine a Tx rate value for the client device, and decodes a fifth portion of the RF signature to determine a digital predistortion value for the client device.

At block 608, the receiver 120 compares the CFO estimate and the encoded CFO to historical expected CFO value thresholds. In some examples, the receiver 120 also compares decoded portions of the RF signature to various thresholds to confirm a source of the packet as the client device. For example, the receiver 120 compares the encoded RF values 320 to the RF values 340.

At block 610, when the comparison indicates the CFO estimate is within expected CFO values, method 600 proceeds to block 612 where the receiver processes the packet such as processing the payload and/or forwarding the packet to a destination, etc.

At block 610, when the comparison indicates the encoded CFO is outside of expected CFO values, method 600 proceeds to block 614 where the receiver 120 marks the packet for further inspection. In some examples, the packet 305 may also include various information transmitted from the sending device 110a indicating various reasons the verification may be out of date. In this example, the receiver 120 will inspect the packet using high level security functions to verify the contents of the packet and the source etc. In some examples, the marked packet is dropped or not processed when there is no extenuating circumstance for why the validation of the RF signature value did not occur.

Figure 7:
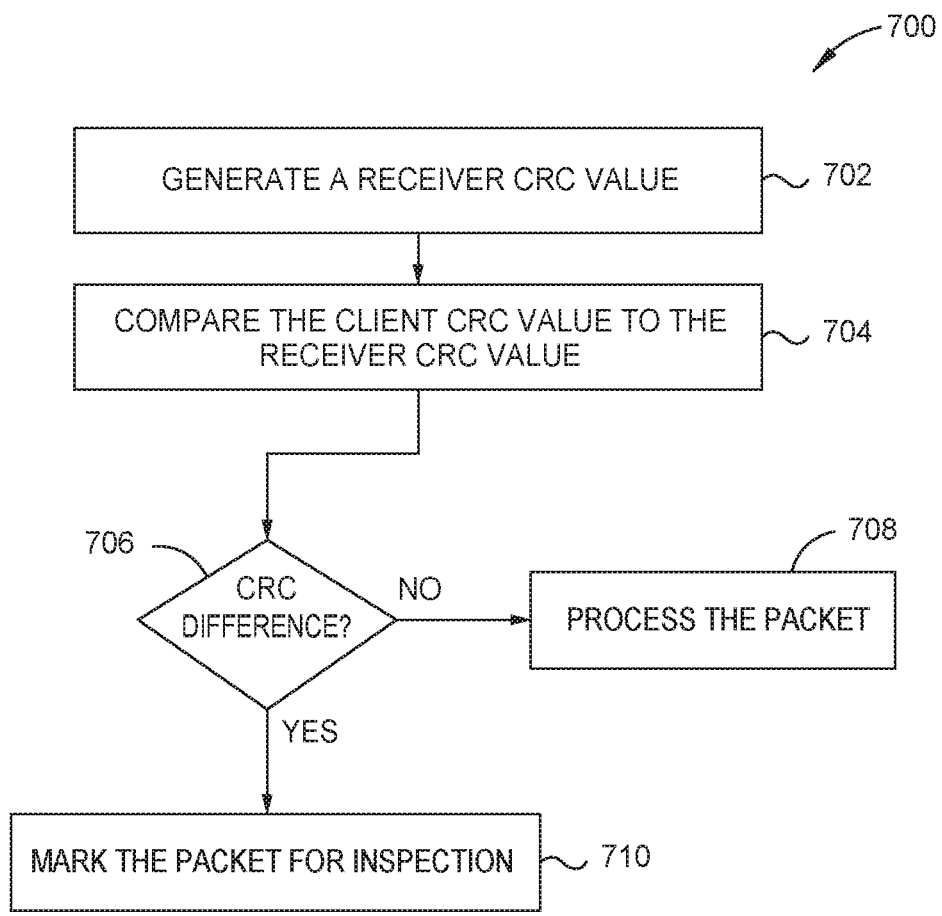
FIG. 7 is a method for CRC generation at a receiver, according to one embodiment.
Figure 8:
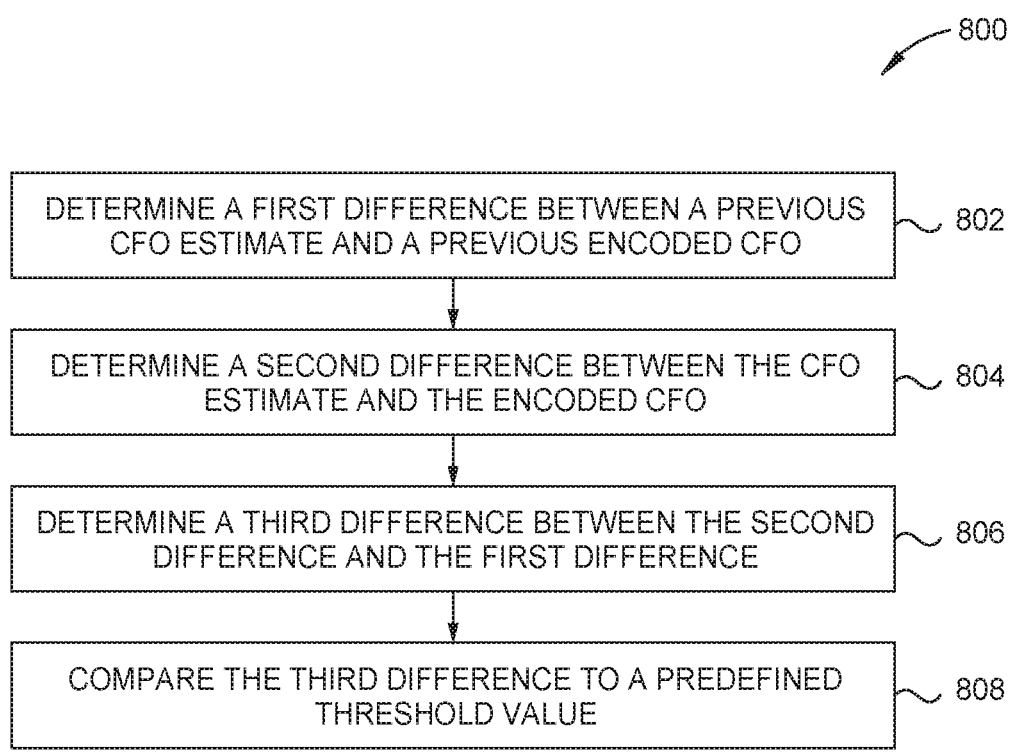
FIG. 8 is a method for RF signature verification at a receiver, according to one embodiment.

FIG. 7 is a method 700 for CRC generation at a receiver, according to one embodiment. Method 700 begins at block 702 where the receiver 120 generates a receiver CRC value and compares the client CRC value to the receiver CRC value at block 704. In some examples, the receiver 120 determines an initial state for CRC generation for the client device such as the sending device 110a in order to provide granular differences in CRC generation among the connected client/sending devices. The initial state is transmitted to the client device for use in generating the client CRC value and used at the receiver 120 generate the receiver CRC value in block 702.

At block 706, when the comparison indicates a difference in the client CRC value and the receiver CRC value the method 700 proceeds to block 710 where the receiver 120 marks the packet for further inspection. When the CRC values match, method 700 proceeds to block 708 where the receiver 120 processes the packet such as proceeding to block 612 of FIG. 6.

FIG. 8 is a method for RF signature verification at a receiver, according to one embodiment. Method 800 begins at block 802 where the receiver 120 determines a first difference between a previous CFO estimate and a previous encoded CFO. For example, using Equation 1, the receiver 120, using historical RF values 380, determines a difference between an estimated CFO for a previous packet (f1), and a previous encoded CFO value (f2). The difference between f2 and f1 is a previous expected error between estimated and observed CFOs for the sending device.

At block 804, the receiver 120 determines a second difference between the CFO estimate and the encoded CFO. For example, the receiver 120 determines a difference CFO value 361 (f3) and CFO value 312 (f3), The difference between f4 and f3 is a current expected error between estimated and observed CFOs for the sending device.

At block 806, the receiver 120 determines a third difference between the second difference and the first difference and at block 808, the receiver 120 compares the third difference to a predefined threshold value. For example, as described in Equation 1, when the difference ((f4−f3)−(f2−f1)) is less than or equal to the threshold value, the RF signature value 350 is considered valid or verified as coming from the indicated sending device (e.g., the sending device 110a. When the third difference is above the threshold value, the RF signature cannot be verified.

Figure 9:
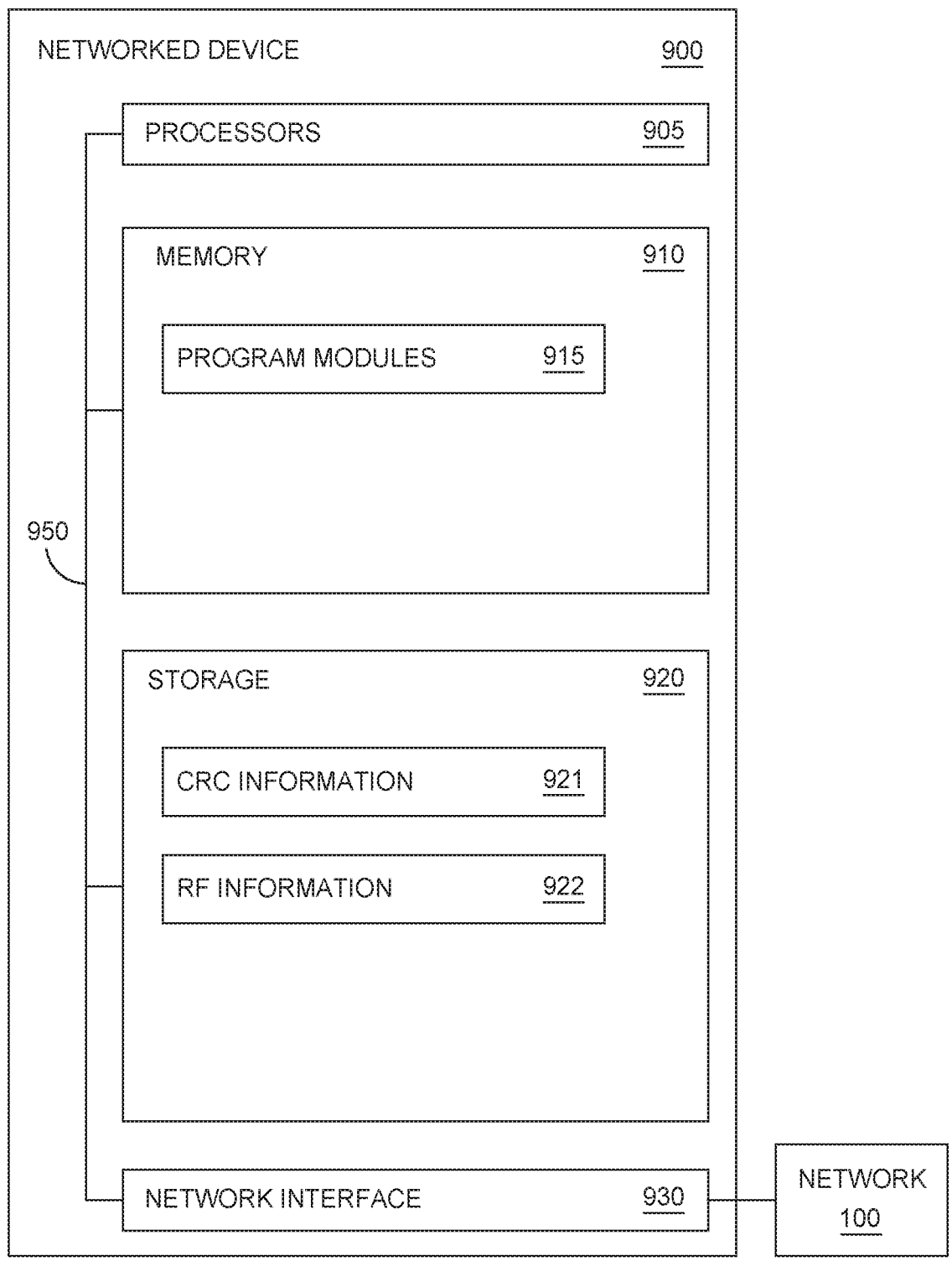
FIG. 9 is a block diagram of a networked device, according to one embodiment described herein.

FIG. 9 is a block diagram of a networked device, according to one embodiment described herein. The networked device 900 may be embodied as either a client or sending device (e.g., the sending devices 110a-c) or a receiver such as the receiver 120. As shown in FIG. 9, the networked device 900 may include a computing device configured to execute the various functions of the interfaces described herein. The networked device 900 is shown in the form of a general-purpose computing device, but may include a server and/or application executing on a cloud network. The components of networked device 900 may include, but are not limited to, one or more processors 905, a system memory 910, a storage system 920, network interface 930 connecting the networked device 900 to network 100, and a bus 950 that couples various system components including the system memory 910 and storage system 920 to processors 905 along with various input/output components (not shown). In other embodiments, networked device 900 is distributed and includes a plurality of discrete computing devices that are connected through wired or wireless networking.

Bus 950 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The networked device 900 typically includes a variety of computer system readable media. Such media may be any available media that is accessible by networked device 900, and it includes both volatile and non-volatile media, removable and non-removable media.

System memory 910 can include computer system readable media in the form of volatile memory, such as random access memory (RAM) and/or cache memory. Networked device 900 may further include other removable/non-removable, volatile/non-volatile computer system storage media. By way of example, storage system 920 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 950 by one or more data media interfaces. As will be further depicted and described below, system memory 910 may include at least one program product having a set (e.g., at least one) of program modules 915 that are configured to carry out the functions of various embodiments described herein. For example, the module described in relation to FIG. 1-3 may be embodied as program modules in the networked device 900. The program modules 915 may also interact with each other and storage system 920 to perform certain functions as described herein.

Networked device 900 may further include other removable/non-removable, volatile/non-volatile computer system storage media. In some examples, storage system 920 may be included as part of system memory 910 and may typically provide a non-volatile memory for the networked computing devices, and may include one or more different storage elements such as Flash memory, a hard disk drive, a solid state drive, an optical storage device, and/or a magnetic storage device. For example, storage system 920 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 950 by one or more data media interfaces. Storage system 920 may include media for CRC information 921 and RF information 922 for either sending devices and/or receivers based on the embodiment of the networked device 900.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
    determining, at a receiver, a carrier frequency offset (CFO) estimate for a client device;
    receiving a packet with an RF signature value marked as from the client device;
generating a receiver cyclic redundancy check (CRC) value using a CRC algorithm based on at least a portion of the packet;
    decoding the RF signature value to determine an encoded CFO for the client device using a predefined mapping algorithm, wherein the predefined mapping algorithm was assigned, to the client device, by the receiver;
    decoding the RF signature value to determine a client CRC value using the predefined mapping algorithm;
    comparing the CFO estimate and the encoded CFO to one or more expected CFO value thresholds;
    comparing the receiver CRC value and the client CRC value; and
    determining that the comparisons indicate that a difference between the CFO estimate and the encoded CFO is within the one or more expected CFO value thresholds and the receiver CRC value matches the client CRC value; and
    in response to the determination that the difference is within the one or more expected CFO value thresholds and the CRC values match, processing the packet.
2. The method of claim 1, further comprising:
    when the comparisons indicate a difference in the client CRC value and the receiver CRC value or that the difference between CFO estimate and the encoded CFO is not within the one or more expected CFO value thresholds, marking the packet for further inspection.
3. The method of claim 1, wherein the RF signature value is decoded using a predefined mapping algorithm, and wherein the method further comprises:
    assigning the predefined mapping algorithm to the client device, wherein the client device uses the predefined mapping algorithm to map the encoded CFO to the CRC value at the client device.
4. The method of claim 1, wherein the method further comprises:
    determining an initial state for CRC generation for the client device; and
    transmitting the initial state to the client device for use in generating the client CRC value.

5. The method of claim 1, wherein comparing the CFO estimate and the encoded CFO to the expected CFO value threshold comprises:
  determining a first difference between a previous CFO estimate and a previous encoded CFO;
  determining a second difference between the CFO estimate and the encoded CFO;
  determining a third difference between the second difference and the first difference; and
  comparing the third difference to a predefined threshold value, wherein the CFO estimate is within expected CFO values when the third difference is equal to or below the predefined threshold value.

6. The method of claim 1, further comprising:
  decoding a first portion of the RF signature value to determine the encoded CFO for the client device;
  decoding a second portion of the RF signature value to determine a transmit power value for the client device;
  decoding a third portion of the RF signature value to determine a packet length value for the packet;
  decoding a fourth portion of the RF signature value to determine a transmission rate value for the client device; and
  decoding a fifth portion of the RF signature value to determine a digital predistortion value for the client device.

7. The method of claim 6, further comprising:
  comparing decoded portions of the RF signature value to various thresholds to confirm a source of the packet as the client device.

8. The method of claim 1, where when the packet is marked for further inspection the method further comprises at least one of:
  transmitting packet information to a high level security function for verification; and
  dropping the packet from processing at the receiver.

9. A system comprising one or more computer processors and a memory containing a program which when executed by the computer processors performs an operation comprising:
  determining, at a receiver, a carrier frequency offset (CFO) estimate for a client device;
  receiving a packet with an RF signature value marked as from the client device;
  generating a receiver cyclic redundancy check (CRC) value using a CRC algorithm based on at least a portion of the packet;
  decoding the RF signature value to determine an encoded CFO for the client device using a predefined mapping algorithm, wherein the predefined mapping algorithm was assigned, to the client device, by the receiver;
  decoding the RF signature value to determine a client CRC value using the predefined mapping algorithm;
  comparing the CFO estimate and the encoded CFO to one or more expected CFO value thresholds;
  comparing the receiver CRC value and the client CRC value; and
  determining that the comparisons indicate that a difference between the CFO estimate and the encoded CFO is within the one or more expected CFO value thresholds and the receiver CRC value matches the client CRC value; and
  in response to the determination that the difference is within the one or more expected CFO value thresholds and the CRC values match, processing the packet.

10. The system of claim 9, where in the operation further comprises:
  when the comparisons indicate a difference in the client CRC value and the receiver CRC value or that the difference between CFO estimate and the encoded CFO is not within the one or more expected CFO value thresholds, marking the packet for further inspection.

11. The system of claim 9, wherein the RF signature value is decoded using a predefined mapping algorithm, and wherein the operation further comprises:
  assigning the predefined mapping algorithm to the client device, wherein the client device uses the predefined mapping algorithm to map the encoded CFO to the CRC value at the client device;
  determining an initial state for CRC generation for the client device; and
  transmitting the initial state to the client device for use in generating the client CRC value.

12. The system of claim 9, wherein comparing the CFO estimate and the encoded CFO to expected CFO value threshold comprises:
  determining a first difference between a previous CFO estimate and a previous encoded CFO;
  determining a second difference between the CFO estimate and the encoded CFO;
  determining a third difference between the second difference and the first difference; and
  comparing the third difference to a predefined threshold value, wherein the CFO estimate is within expected CFO values when the third difference is equal to or below the predefined threshold value.

13. The system of claim 9, wherein the operation further comprises:
  decoding a first portion of the RF signature value to determine the encoded CFO for the client device;
  decoding a second portion of the RF signature value to determine a transmit power value for the client device;
  decoding a third portion of the RF signature value to determine a packet length value for the packet;
  decoding a fourth portion of the RF signature value to determine a transmission rate value for the client device;
  decoding a fifth portion of the RF signature value to determine a digital predistortion value for the client device; and
  comparing decoded portions of the RF signature value to various thresholds to confirm a source of the packet as the client device.

14. The system of claim 9, where when the packet is marked for further inspection the operation further comprises at least one of:
  transmitting packet information to a high level security function for verification; and
  dropping the packet from processing at the receiver.

* * * * *